United States Patent [19]

Wood et al.

[11] Patent Number: 5,098,470

[45] Date of Patent: Mar. 24, 1992

[54] ALLOY MIX OF TWO ALLOY POWDERS

[75] Inventors: Philip S. Wood, Lancashire; Peter J. Fell, Yorkshire, both of England

[73] Assignee: Rolls-Royce plc, London, England

[21] Appl. No.: 670,490

[22] Filed: Mar. 13, 1991

Related U.S. Application Data

[63] Continuation-in-part of Ser. No. 539,314, Jun. 15, 1990, abandoned, which is a continuation of Ser. No. 363,728, Jun. 9, 1989, abandoned.

[30] Foreign Application Priority Data

Jul. 14, 1988 [GB] United Kingdom ............... 8816738

[51] Int. Cl.$^5$ ............................................. C22C 19/05
[52] U.S. Cl. ........................................ 75/255; 420/448
[58] Field of Search ................. 75/244, 246, 255; 420/448; 148/429; 228/194

[56] References Cited

U.S. PATENT DOCUMENTS

| | | | |
|---|---|---|---|
| 3,155,491 | 11/1964 | Sidney et al. | 75/255 |
| 3,227,544 | 1/1966 | Rowady | 75/255 |
| 3,246,981 | 4/1966 | Quaas et al. | 228/194 |
| 3,383,197 | 5/1968 | Albers et al. | 75/255 |
| 3,678,570 | 7/1972 | Paulonis et al. | 228/194 |
| 4,008,844 | 2/1977 | Duvall et al. | 228/119 |
| 4,219,592 | 8/1980 | Anderson et al. | 428/680 |
| 4,381,944 | 5/1983 | Smith, Jr. et al. | 75/255 |
| 4,466,829 | 8/1984 | Nighigaki et al. | 75/255 |
| 4,478,638 | 10/1984 | Smith, Jr. et al. | 75/255 |
| 4,830,934 | 5/1989 | Ferrigno et al. | 75/255 |
| 4,910,098 | 3/1990 | Lee et al. | 75/255 |

FOREIGN PATENT DOCUMENTS

1-165741 6/1989 Japan .

*Primary Examiner*—George Wyszomerski
*Attorney, Agent, or Firm*—Cushman, Darby & Cushman

[57] ABSTRACT

An alloy mix suitable for the repair of nickel-based alloy components is disclosed. The alloy mix contains a mixture of two alloy powders. The constituents of the first powder, in percentages by weight are:

| | |
|---|---|
| Al | 2-3 |
| Co | 9-11 |
| Cr | 8-10 |
| Fe | 0-1.8 |
| Hf | 1.0-1.5 |
| Ta | 1.-1.5 |
| Ti | 1.25-1.75 |
| W | 6-8 |
| B | 2.8-3.4 |
| Y | 0.001-0.02 |
| Ni | Remainder | and the constituents of the second powder, in percentages by weight, are:

| | |
|---|---|
| C | .13-.17 |
| Al | 5.25-5.75 |
| B | 0.01-0.02 |
| Co | 9.0-11.0 |
| Cr | 8-10 |
| Hf | 1.3-1.7 |
| Ta | 2.25-2.75 |
| Ti | 1.25-1.75 |
| W | 9.5-10.5 |
| Zr | 0.03-0.08 |
| Ni | Remainder |

3 Claims, No Drawings

ALLOY MIX OF TWO ALLOY POWDERS

This is a continuation-in-part of application Ser. No. 07/539,314, filed on June 15, 1990, abandoned, which is a continuation of Ser. No. 07/363,728, filed June 9, 1989, abandoned.

The present invention relates to an alloy mix suitable for the repair of articles which are used in a high temperature environment. The invention also relates to a method of achieving a repair with the alloy.

According to the present invention an alloy mix suitable for repair of Nickel based alloy articles which are used in a high temperature environment comprises a first alloy, the constituents of which by weight percentage are:

TABLE I

| | |
|---|---|
| Al | 2–3 |
| Co | 9–11 |
| Cr | 8–10 |
| Fe | 0–1.8 |
| Hf | 1.0–1.5 |
| Ta | 1.0–1.5 |
| Ti | 1.25–1.75 |
| W | 6–8 |
| B | 2.8–3.4 |
| Y | 0.001–0.02 |
| Ni | Remainder | mixed with a second alloy, the constituents of which by weight are:

TABLE II

| | |
|---|---|
| C | .13–.17 |
| Al | 5.25–5.75 |
| B | 0.01–0.02 |
| Co | 9.0–11.0 |
| Cr | 8–10 |
| Hf | 1.3–1.7 |
| Ta | 2.25–2.75 |
| Ti | 1.25–1.75 |
| W | 9.5–10.5 |
| Zr | 0.03–0.08 |
| Ni | Remainder | and wherein the weight percentages of the first alloy to the second alloy is in the range 60:40 to 50:50.

The invention further provides a method of repairing a component with said alloy mix, which comprises the steps of mixing the alloy mix with a binder, applying the bound alloy mix to the component, heating the component in steps to a desired maximum, quenching the component in an inert gas to about 75% of the maximum temperature so reached, reheating the component at a constant rate to several pre-selected values of temperature, interspersed with periods of time which start as each selected temperature is reached including the desired final temperature, inert gas quenching the component to below a given value, followed by cooling the component to room temperature in ambient air.

The invention will now be described, by way of example.

A gas turbine blade of the kind which is used in a gas turbine engine and made from a nickel based alloy, frequently has score marks and/or fissures accidentally machined thereon, during an electro discharge machining operation on it.

The score marks must be filled in order to avoid cracking of the blade and to maintain proper flow conditions over the blade surface when in service.

The filling must be a metal which is compatible with the metal from which the blade is constructed and further, must be workable at temperatures below those which the blade operates in a gas turbine engine and yet, after the repair, must be in a condition which does not result in the filling being lost under those conditions. Thus a first alloy is made up from the following constituents, the quantities of each of which is stated by weight percentage.

TABLE III

| | |
|---|---|
| Al | 2–3 |
| Co | 9–11 |
| Cr | 8–10 |
| Fe | 0–1.8 |
| Hf | 1.0–1.5 |
| Ta | 1.0–1.5 |
| Ti | 1.25–1.75 |
| W | 6–8 |
| B | 2.8–3.4 |
| Y | 0.001–0.02 |
| Ni | Remainder |

A second alloy is provided which is made up from the following constituents, again stated by weight percentage. The second alloy is a propriety alloy, sold as MarM002.

TABLE IV

| | |
|---|---|
| C | .13–.17 |
| Al | 5.25–5.75 |
| B | 0.01–0.02 |
| Co | 9.0–11.0 |
| Cr | 8–10 |
| Hf | 1.3–1.7 |
| Ta | 2.25–2.75 |
| Ti | 1.25–1.75 |
| W | 9.5–10.5 |
| Zr | 0.03–0.08 |
| Ni | Remainder |

Both of the alloys are ground to a powder, the size of the particles of which is less than 106 um.

The powders are then mixed thoroughly by any known and convenient means, to provide in powder form, an alloy mix in the ratio 60:40 to 50:50 by weight of the first and second alloys respectively.

In the alternative, the constituents of both of the alloys may be melted and mixed together using each alloy with the above stated quantities by weight percentage. The resulting compound may then be employed to effect repair by either cooling the compound and then grinding the compound to a powder or by applying the compound in molten form to the site for the repair.

As stated hereinbefore, the filling must be compatible with the metal from which the component is made. Thus, the alloy mix of the present invention may be used to effect a repair of a component which is made from MarM002.

To enable applications of the powdered alloy mix into the fissure or score mark, it is further mixed with an acrylic or water based binder of any suitable, freely available type and is then loaded into a syringe, use of which also ensures accuracy of position and quantity applied.

After cleaning the component, the powder mix is applied to the fissure via the syringe and then the component is placed in an vacuum furnace, which then is purged of air, so as to avoid oxidising of the assembly.

A heating and cooling cycle is then effected as follows:

a) Heat to 450° C. and hold for 30 minutes.
b) Increase to 950° and hold for 30 minutes.
c) Increase to 1190° C. and hold for 30 minutes. The increases in heat should be achieved as quickly as possible, such that they are effectively steps.
d) After holding the temperature at 1190° C. for 30 minutes, the component is gas fan quenched to 900° C. and thereafter, the heat is again increased, this time with a specific rate of increase as follows:
e) Heat from 900° up to 1080° C. at 50° per hour and hold for 30 minutes.
f) Heat from 1080° C. up to 1140° C. at 50° C. per hour and hold for 30 minutes.
g) Heat from 1140° C. to 1190° C. at 50° per hour and hold for 30 minutes.
h) Gas fan quench to below 100° C. and then to room temperature in ambient room atmosphere.

The first mentioned heating and quenching effects alloying of the two alloys and brazing of the resulting alloy to the component. The second mentioned heating steps effect diffusion of the new alloy and the material of the component across the interface, so as to provide an integral product.

The second gas fan quenching cools the component sufficiently to avoid oxidising of its surface when it is removed from the heating device, into ambient atmosphere.

Components made from the alloy described in table II herein and repaired by the alloy achieved by mixing and heating the alloys disclosed in tables I and II as described hereinbefore, have been mechanically stress tested and have been found to possess those appropriate characteristics which are present in undamaged components made from the alloy in table II herein.

We claim:

1. An alloy mix suitable for the repair of nickel based alloy components which are used in a high temperature environment comprises a first alloy, the constituents of which by weight are:

| | |
|---|---|
| Al | 2-3 |
| Co | 9-11 |
| Cr | 8-10 |
| Fe | 0-1.8 |
| Hf | 1.0-1.5 |
| Ta | 1.0-1.5 |
| Ti | 1.25-1.75 |
| W | 6-8 |
| B | 2.8-3.4 |
| Y | 0.001-0.02 |
| Ni | Remainder | mixed with a second alloy the constituents of which by weight are:

| | |
|---|---|
| C | .13-.17 |
| Al | 5.25-5.75 |
| B | 0.01-0.02 |
| Co | 9.0-11.0 |
| Cr | 8-10 |
| Hf | 1.3-1.7 |
| Ta | 2.25-2.75 |
| Ti | 1.25-1.75 |
| W | 9.5-10.5 |
| Zr | 0.03-0.08 |
| Ni | Remainder | and wherein said first and second alloys are in powder form and the weight ratio of the first alloy to the second alloy is in the range 60:40 to 50:50.

2. An alloy mix as claimed in claim 1 wherein the weight ratio of the first alloy to the second alloy is 60:40.

3. An alloy as claimed in claim 1 wherein the grain size of the powders is less than 106 um.

* * * * *